United States Patent Office 3,445,434
Patented May 20, 1969

3,445,434
COPOLYMERS OF TETRAFLUOROETHYLENE, ETHYLENE AND AN OLEFINIC ACID
Frederic B. Stilmar, Wilmington, Del., assignor to E. I. du Pont de Nemours and Company, Wilmington, Del., a corporation of Delaware
No Drawing. Filed Oct. 30, 1964, Ser. No. 407,868
Int. Cl. C08f 15/40
U.S. Cl. 260—80.71                  16 Claims

ABSTRACT OF THE DISCLOSURE

Copolymers of (1) tetrafluoroethylene, (2) from about 0.75 to 1.75 moles ethylene per mole of tetrafluoroethylene, (3) from about 0.001 to 0.1 mole per mole of tetrafluoroethylene of at least one polymerizable olefinic acid having an acidity constant of from 1.0 to 5.5, the lower alkyl esters, the salts, and the anhydrides of such acids, and, optionally, (4) from 0 to 0.5 mole of an olefin chosen from (a) aliphatic hydrocarbons from 3 to 8 carbon atoms having only one terminal ethylenically unsaturated polymerizable group, (b) polymerizable aliphatic halogenated olefins of 2 to 3 carbons, said halogen being chlorine or fluorine, (c) vinyl alkyl ethers, wherein the alkyl group contains from one to six carbon atoms, and (d) vinyl esters of $C_2$ to $C_{18}$ alkane carboxylic acids.

---

The present invention is directed to fluorine-containing polymers, and more particularly to polymers containing units derived from tetrafluoroethylene, ethylene and certain polymerizable olefinic acids. The polymerizable interpolymers of this invention are particularly useful as protective coating materials for metals. The interpolymers of this invention may also be used for molding, fiber and self-supporting film applications.

Fluorinated olefin polymers have been in industrial use for a number of years. Such polymers as polytetrafluoroethylene and copolymers of tetrafluoroethylene and ethylene have been known to possess a unique combination of highly desirable physical and chemical properties. For example, polytetrafluoroethylene combines the unique characteristics of being essentially inert to chemical attack while at the same time having thermal stability, excellent dielectric properties and antistick characteristics. However, both polytetrafluoroethylene and the copolymers of tetrafluoroethylene and ethylene are not commercially useful as coating materials because they alone do not adhere well to substrates, particularly to metal substrates for any extended period in outdoor conditions.

It is, therefore, an object of this invention to provide polymers possessing the unique properties of being melt applicable to substrates, insoluble in most organic liquids at ambient temperatures, and strongly adhesive to substrates such as metals during long periods of outdoor exposure.

This and other objects will become apparent hereinafter.

The polymers of the present invention have the balance of properties specifically required for protective surface coatings. Ease of application is one essential requirement for protective surface coating materials. The polymers of this invention melt at temperatures below 275° C. to flowable liquids which are readily applied to metal surfaces by the well-known melt-application techniques. Further, the polymers of this invention are insoluble or only very slightly soluble in organic solvents at ambient temperatures and hence coatings thereof on metals resist removal by solvents. The polymer coatings of this invention are tractable and durable to weathering, sunlight and exposure to fumes for long periods of time. Being essentially insoluble in organic solvents, they find use in situations where contact with organic solvents takes place. This is an important characteristic of the polymers of the present invention, since their insolubility in organic solvents enables the polymers to find use as protective coatings on process equipment, as linings in drums and containers and the like, and as coatings on metallic apparatus or vehicles exposed to gasoline. In general, the polymers of this invention are particularly useful in situations where a protective coating is necessary and where exposure to organic solvents is unavoidable. No other available coating materials offer the combination of high adhesion, durability to light, fumes and weathering, high thermal stability and chemical inertness, high melting point, ease of application to substrates and resistance to solvent attack as offered by the present polymer coating materials.

It is important to note that the polymers of the present invention are self-adhesive to a variety of substrates. In other words, the polymers of the present invention adhere to substrates without the addition of a separate bonding or adhesive agent. Furthermore, adhesion in polymer coatings cannot be simply initial adhesion, but must be durable adhesion which will stand up after long periods of outdoor exposure. It has been found that long-term, durable adhesion can be expressed in terms of adhesion which is stable to heat, light, and water vapor at the interface of the coating and the substrate. No other available coating materials offer the combination of unique properties enumerated above while at the same time possessing long-term outdoor durable adhesion as offered by the polymers of this invention.

The polymeric compositions of the present invention which combine the above-described unique and desirable properties are multi-component copolymers resulting from the polymerization of (1) tetrafluoroethylene, (2) from about 0.75 to 1.75 moles ethylene per mole of tetrafluoroethylene, (3) from about 0.001 to 0.1 mole per mole of tetrafluoroethylene of at least one polymerizable olefinic acid having an acidity constant of from 1.0 to 5.5, the lower alkyl esters, the salts, and the anhydrides of such acids, and, optionally, (4) from 0 to 0.5 mole of an olefin chosen from (a) aliphatic hydrocarbons from 3 to 8 carbons atoms having only one terminal ethylenically unsaturated polymerizable group, (b) polymerizable aliphatic halogenated olefins of 2 to 3 carbons, said halogen being chlorine or fluorine, (c) vinyl alkyl ethers, wherein the alkyl group contains from one to six carbon atoms, and (d) vinyl esters of $C_2$ to $C_{18}$ alkane carboxylic acids.

The present polymer compositions must contain three essential ingredients. These ingredients are tetrafluoroethylene, ethylene and a polymerizable olefinic acid or acid derivative as set forth above. As long as both tetrafluoroethylene and ethylene are present in the polymerization mixture, both monomers appear to enter the polymer in approximately a 1 to 1 ratio. The polymers of the present invention, therefore, apparently contain, in part at least, the repeating units —$CF_2CF_2CH_2CH_2$— in regular order. The other monomers which are present in the polymerization mixture, such as the polymerizable acid monomer and the optional monomer, are interspersed along the polymer chain among these repeating units in random order.

The relative ratio of the various monomers in the polymers of this invention are 0.75 to 1.75 moles of ethylene and 0.001 to 0.1 mole of the polymerizable acid monomer per mole of tetrafluoroethylene. If less than 0.75 mole of ethylene is used, the resulting polymers possess such high melting points and are so intractable that they cannot be used as coating materials. If more than 1.75 moles of ethylene per mole of tetrafluoroethylene is used, the polymers become deficient in outdoor durability and chemical inertness, and hence do not posses the necessary properties for utilization as protective coating materials. If less polymerizable acid than the 0.001 mole limit is present in the polymerizable mixture, the adhesion durability of the resultant polymers as coatings on metals is markedly lessened. If more than 0.1 mole of the acid monomer is used, the properties of the resulting polymers are adversely affected in that they become overly reactive toward alkaline reagents and sensitive to water. Also, because of the nature if most of the polymerizable acids, it is difficult to obtain copolymers containing more than 0.1 mole of a polymerizable acid per mole of tetrafluoroethylene. The preferred range of acid monomer is from 0.01 to 0.05 mole per mole of tetrafluoroethylene.

The polymerizable acid monomers utilized in forming the polymers of the present invention are olefinic acids having an acidity constant of from 1.0 to 5.5. More specifically, the polymerizable olefinic acid monomer includes (A) the ethylenically unsaturated mono- and dicarboxylic acids having from three to eleven carbon atoms, (B) the lower alkyl mono- and diesters, the salts and the anhydrides of such carboxylic esters, (C) the ethylenically unsaturated phosphonic acids having up to eighteen carbon atoms, and (D) the lower alkyl mono- and diesters, the salts and the anhydrides of such phosphonic acids. Specific representative examples of such acid monomers include unsaturated carboxylic acids such as acrylic, methacrylic, maleic, fumaric, crotonic, itaconic, undecylenic, 3-methylenecyclobutane carboxylic acid, and similar polymerizable aliphatic carboxylic acids. The group also includes alkenephosphonic acids such as vinylphosphonic acid, allylphosphonic acid, butenylphosphonic acid, and 17-octadecenephosphonic acid. In place of the free acids one may use derivatives of the acids which are hydrolyzable to the acid such as the lower alkyl or haloalkyl esters. Useful examples of the esters of the above acids include the various isomeric methyl, ethyl, propyl, butyl, amyl, and hexyl mono- and diesters. In the case of the phosphonic acids, it is preferable to use the esters because the free acids are quite hydroscopic.

The particular polymerizable acid monomer chosen for utilization in the polymers of the present invention depends on the end use intended for the particular polymer. For coatings on ferrous metals, the carboxylic acid monomers and particularly itaconic acid or anhydride are preferred. For coatings on aluminum, copper, zinc and other nonferrous metals, the polymerizable phosphonic acids and particularly vinylphosphonic acid are preferred. The particular acidic monomers designated above are preferred since they give maximum adhesion durability to the resulting polymer coatings on the specified metal substrates. However, all the polymerizable acid monomers having an acidity constant of from 1.0 to 5.5 will give polymers which adhere strongly to all common metals.

For certain purposes, particularly if it is desired to lower the melting point or slightly increase the solubility of product polymers for improved ease of application to substrates or ease of fabricability, it is desirable to add to the polymerizable mixture from 0.05 to 0.5 mole per mole of tetrafluoroethylene of another monomer. These optional monomers are chosen from four classes. The first class in the aliphatic olefins of structures RR'C=CH$_2$ containing 3 to 8 carbons wherein R is alkyl and R' is hydrogen or alkyl and where both R and R' may combine to form a cycloaliphatic group to form compounds such as methylenenorbornylene and methylenecyclohexane. The second class is the halogenated olefins of 2 to 3 carbons containing chlorine or fluorine such as chloroolefins, fluoroolefins, and chlorofluoroolefins (including both partly halogenated and fully halogenated olefins). The third and fourth classes are, respectively, the alkyl vinyl ethers and vinyl esters of alkane carboxylic acids.

Examples of the optional hydrocarbon olefins are propylene, isobutylene, 1-hexene, methylenecyclohexane, methylenenorbornylene (only the exocyclic double bond is polymerizable) and the like containing from 3 to 8 carbons. Examples of the optional polymerizable halogenated olefins are vinyl chloride, vinyl fluoride, vinylidene chloride, vinylidene fluoride, chlorofluoroethylene, chlorotrifluoroethylene, hexafluoropropylene, 1,1-dichlorodifluoroethylene, trifluoromethylethylene, and trifluoroethylene. Useful examples of the optional alkyl vinyl ethers are methyl vinyl ether, ethyl vinyl ether, propyl vinyl ether, isopropyl vinyl ether, isobutyl vinyl ether, hexyl vinyl ether, perfluoromethyl perfluorovinyl ether, 1-trifluoromethyl-2,2,2-trifluoroethyl vinyl ether, n-butyl perfluorovinyl ether, 2,2,2-trifluoroethyl perfluorovinyl ether, and 1,1,2-trifluoro-2-chloroethyl vinyl ether. Examples of the optional vinyl esters of alkane carboxylic acids are vinyl esters of the fatty acid series from acetic to stearic acids and vinyl esters such as

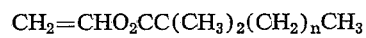

where $n$ is zero to nine, e.g.,

The most preferred compositions of the present invention are those where no fourth or optional component is present, i.e., the terpolymers of tetrafluoroethylene, ethylene, and a polymerizable acidic comonomer of the type discussed above.

Of these desired terpolymers, the most preferred compositions are the polymers containing equal molar amounts of tetrafluoroethylene and ethylene and approximately 0.01 to 0.05 mole of itaconic acid, acrylic acid, dimethyl allylphosphonate, bis(2-chloroethyl)vinylphosphonate or dineopentyl vinylphosphonate.

In those tetrapolymers containing the optional monomer, the preferred compositions are those where the optional monomers are isobutylene, vinyl fluoride, chlorotrifluoroethylene, methyl and ethyl vinyl ethers and vinyl butyrate.

If desired, additional inert materials such as pigments, ultraviolet adsorbing agents or fillers may be incorporated in the polymers of the present invention. These materials may be combined with the polymers, either by being included in the polymerization mixtures or, more preferably, by ball or sand milling a dispersion of the formed polymer with the inert material. The resulting dispersion of polymer and inert material may be applied directly to the metal surface if followed by a heat treatment. The copolymers containing such inert additives are included in the products of the present invention.

The polymers of the present invention are applied to substrates by well-known melt-application techniques. However, for maximum adhesion it is preferred to follow the melt application of the present polymers with a heat treatment. The heat treatment insures uniform coating thickness, complete coverage and maximum adhesion. If the heat treatment is not used, adhesion initially at least is lower and slow to develop to the maximum. The subsequent heat treatment consists of passing the melt-coated metal object through an oven or other heating device for one to two minutes at 175 to 200° C. followed by cooling.

The polymers of the present invention, which give the unique combination of properties necessary for coating compositions, comprise in weight percent from 55 to 80% tetrafluoroethylene, from 13 to 30% ethylene, from 0.01 to 10% polymerizable acid monomer, and from 0 to 30% of the optional monomer. The preferred weight range of the polymers of the present invention is from 60 to 80% tetrafluoroethylene, from 15 to 25% ethylene, from 0.1 to 5% polymerizable acid monomer, and, if present, from 5 to 20% of the optional monomer.

The terpolymers of tetrafluoroethylene/ethylene/and polymerizable acid monomer of this invention are characterized by their insolubilities in common organic solvents. Generally, the terpolymers of this invention are only soluble in dimethylacetamide at room temperature to an extent of less than 0.1% by weight.

The polymers of the present invention are prepared by polymerizing mixtures of the various monomers together in the presence of a free radical initiating system, including peroxy compounds, azo compounds, ultraviolet light and ionizing radiation, in either inert organic solvents or in an aqueous suspension or emulsion. Many useful inert solvents or solvent combinations for the subject polymerization are well known to those skilled in the art. These solvents include the lower molecular weight, straight-chain saturated fatty acids such as acetic acid, tertiary alcohols such as tertiary-butyl alcohol, saturated aliphatic nitriles such as acetonitrile, chlorofluorocarbons and fluorocarbons such as trichlorotrifluoroethane, perfluorodimethylcyclobutane or perfluorodimethylcyclohexane, certain inert esters such as 2,2,3,3-tetrafluoropropyl acetate, and halogenated aromatic hydrocarbons such as orthodichlorobenzene. The use of these particular solvents allows the preparation of higher molecular weight polymers of more uniform composition under otherwise equivalent conditions than other solvents. Solvent combinations such as trichlorotrifluoroethane with acetonitrile or acetic acid, tertiary-butyl alcohol with acetic acid or water, acetic acid with monochlorodifluoromethane or tetrafluoropropyl acetate with acetic acid have also been used as effective solvent media in which the polymers of the present invention are prepared. The amount of solvent used in the polymerization should be sufficient to disperse the polymeric product as it is formed. Generally, the weight of solvent should be at least equal the weight of the reactants.

As a general rule, organic peroxides which are soluble in the reaction solvent are used as the free radical initiators. At temperatures below 100° C., acyl peroxides such as dilauroyl peroxide or benzoyl peroxide are useful. However, if the olefinically unsaturated acid monomer is a free carboxylic acid such as acrylic or methacrylic acid, peroxy esters such as tertiary-butyl perbenzoate, tertiary-butyl peroxypivalate or tertiary-butyl peracetate should be used. The polymerization process for preparing the polymers of the present invention are carried out at the decomposition temperatures of the particular free radical generating initiator used. For most polymers, this temperature ranges from about 50° C. to 160° C. In reactions which are particularly difficult to initiate, di-tertiary alkyl peroxides such as di-tertiary-butyl peroxide at 120 to 160° C. are recommended.

Since reaction with the solvent gives low molecular weight brittle polymers, the reaction should be carried out as a general rule at as low a temperature as possible since this minimizes the tendency of the solvent to enter into the reaction. A second mode of minimizing solvent reaction is by the use of higher pressures which increases the concentration of the more volatile monomers such as tetrafluoroethylene in the reaction solvent. Increased amounts of tetrafluoroethylene in the reaction solvent increases the probability of chain propagation over chain transfer with the solvent. Polymerization at higher pressures is further advantageous in that the higher pressures enable the polymerization to be carried out at minimum temperatures.

The copolymerization is carried out in a sealed system adapted to withstand the pressure necessitated by the reaction. The necessary pressures may range from 100 p.s.i.g. to 10,000 p.s.i.g. or higher depending on the particular polymer formed and the free radical initiator used. Either batch or continuous systems may be used. The materials of construction for the reaction system require no special consideration except that they must be capable of withstanding the temperatures and pressures used. Generally, steel, "Monel," "Inconel," "Hastelloy," or stainless steel are used.

In the batch system, the reactants, solvent, and initiator are added to the pressure vessel and heated, usually with agitation, until the reaction stops. The order of addition of reactants is not critical. However, since tetrafluoroethylene and ethylene are volatile gases which must be added under pressure, it is preferred to add the liquid media, free radical initiator and acid monomer to the reaction vessel first and then add the gaseous tetrafluoroethylene and ethylene to the vessel under pressure. Once initiated, many of these polymerizations are exothermic, and care should be taken to maintain temperature control. When the reaction is complete, any unreacted gaseous monomers are removed or recovered. The liquid reaction mass is then diluted with ethyl alcohol or other solvent which causes the polymeric product to precipitate completely. The precipitated product is then washed with alcohol and dried. The reaction solvent may be recovered if desired, but the alcohol used to precipitate the polymer should be carefully removed from the reaction solvent before reuse since the precipitating alcohol would interfere with further polymerizations.

In a continuous process, which is preferred, the solid and liquid monomers being used and the initiator are dissolved in the reaction solvent. The resulting solution is pumped into an agitated pressurized reaction vessel which is liquid-full of reaction mixture at the desired reaction temperature. At the same time, gaseous monomers such as ethylene and tetrafluoroethylene under pressure are forced into the liquid-full reaction vessel. The reactants are admitted into the vessel in essentially the same ratio as desired in the final product. The pressure within the vessel is maintained at or above autogenous pressure by a pressure release valve in the exit line which opens when its release pressure is reached. Since reactants are continuously pumped into the vessel, product is continuously discharged from the system through the pressure release valve. The end product, usually a suspension, is washed with solvent and/or water and dried. The continuous process is preferred because it produces a more uniform product than the batch process. This is probably due to the fact that a continuous operation makes it possible to maintain more uniform concentrations of reactants in the reaction solvent at all times. In a batch process, the concentrations of reactants in the reaction solvent vary as they are consumed. In operating the continuous process, it is especially preferred to use 2,2,3,3-tetrafluoropropyl acetate or ortho-dichlorobenzene as the reaction solvent. Pressures for the continuous process are preferably above autogenous pressure, and more preferably about 800 to 900 p.s.i. The preferred reaction temperature for preparing the majority of polymers of the present invention is from 80 to 100° C. Feed rates are adjusted to produce maximum conversion which usually involves average residence times in the reaction vessel of from 1.5 to 3.0 hours under the preferred conditions cited. It is understood, of course, that the preferred conditions outlined above vary with the particular combination of monomers used.

Representative examples illustrating the present invention follow. All parts are by weight unless specified otherwise. Elemental and instrumental analyses were carried out using standard techniques well known in the art. Outdoor exposures were carried out in the usual manner. The Grid-Bend-Boil Test referred to in the following examples in a rigorous test measuring the degree of coating adhesion of substrates. The test is conducted by first applying the coating to a strip of aluminum followed by any subsequent heat treatment to improve the adhesion of the coating. After the coating operation is complete, a series of perpendicular lines, 8 in each direction, ⅛ inch apart, are scored through the coating to the metal surface beneath. The test strip is then bent or folded so that the bend or fold passes through the cross-hatched area in the coating. The aluminum is bent or folded approximately 180 degrees. The bent strip is then immersed in moiling water for at least one hour. After removal from the boiling water, the coated test strip is examined for signs of failure in the film, which is evidenced by a change in the appearance in the metal underneath the coating. Adhesion of the coating to the substrate is tested by sticking a piece of pressure-sensitive tape over the cross-hatched area. The tape is stuck to the cross-hatched area as it extends from one side of the bent strip across the fold to the other side of the bent strip. The tape is then pulled away. Good adhesion is indicated when none of the coating is removed with the tape. Fair adhesion is indicated when the coating fails only at the bend while poor adhesion is indicated when the coating is removed with the tape from the entire cross-hatched area. Complete failure of the coating is evident when the entire coating delaminates from the surface of the test piece.

Melt flow rate was measured in the following examples using ASTM Method D–1238–62T. The rate was measured at the indicated temperature with a weight of 2160 grams and an orifice size of 0.0825 inch diameter and 0.319 inch length. Melt flow rate can be defined as the weight of molten polymer in grams that passes through the orifice in 10 minutes at the indicated temperature and under the given extrusion weight.

Example 1

A 400 ml. pressure vessel was flushed with dry nitrogen and charged with 300 ml. of 2,2,3,3-tetrafluoropropyl acetate, 0.5 g. of dilauroyl peroxide and 1.2 g. (0.0054 mole) of bis(2-chloroethyl) vinylphosphonate. The vessel was closed, cooled in a carbon ice-acetone bath and evacuated. Fifty g. (0.50 mole) of tetrafluoroethylene and 15 g. (0.535 mole) of ethylene were then pressured into the vessel. The pressure vessel and its contents were shaken and heated to 65° C. at which temperature the autogenous pressure was 600 p.s.i. The shaking and heating of the pressure vessel was continued for 12 hours during which time the temperature was slowly increased to 85° C. At the end of the heating period, the autogenous pressure had dropped to 125 p.s.i. at 85° C. The vessel and its contents were cooled to room temperature, and the reaction mixture discharged into an equal volume of ethanol. A white polymer was separated from the reaction mixture by filtration and washed thoroughly with ethanol. After drying at 100° C. in a vacuum oven, the polymer weighed 68 grams.

Elemental analysis of the polymer revealed a phosphorous content of 0.5% and a fluorine content of 60.0%. These results indicated that a 3.75% by weight content of the groupings in the polymer were derived from the bis(2-chloroethyl) vinylphosphonate and 79% by weight of groupings in the polymer were derived from tetrafluoroethylene. These analyses also indicated that the mole ratios of tetrafluoroethylene:ethylene:bis(2-chloroethyl) vinylphosphonate in the polymer were 1.0/0.8/0.02.

The polymer was readily melt applied to bright aluminum at 300° C. to give a hard, bright, clear coating. Bright aluminum is normally used as the test substrate because this is the most difficult substrate upon which to obtain a coating having long-term adhesion durability. Subjection of this polymer-coated aluminum to the Grid-Bend-Boil Test indicated that the polymer coating adhered strongly to the aluminum substrate. No change in the appearance of the bright aluminum beneath the film coating was noted after the Brid-Bend-Boil Test. In this test, the adhesion of the polymer coating was good even at the bend after 2 hours in boiling water.

Short, rather brittle fibers were also drawn from the melted polymer at 300° C.

Example 2

The procedure for charging the reaction vessel of Example 1 was repeated using 300 ml. of 2,2,3,3-tetrafluoropropyl acetate, 0.4 ml. of t-butyl perbenzoate, 60 g. (0.60 mole) of tetrafluoroethylene, 20 g. (0.71 mole) of ethylene, and 1.0 g. (0.007 mole) of t-butyl methacrylate. The reaction mixture was rapidly heated to 103° C. at which temperature the autogenous pressure was 800 p.s.i., and then, with continuous shaking, the temperature was slowly increased to 115° C. over an 8-hour period. At the end of the 8-hour heating period, the autogenous pressure had dropped to essentially atmospheric pressure. The soft, mushy reaction mixture was diluted with an equal volume of ethanol and the solid polymer separated and washed repeatedly with ethanol in a Waring Blendor. The isolated white solid was dried at 100° C. under vacuum to yield 76 g. of product.

Elemental analysis of the dry polymer product gave the following results:

| | Percent |
|---|---|
| Fluorine | 58.9 |
| Carbon | 38.5 |
| Hydrogen | 3.3 |

The presence of

in the polymer was indicated by a band at about 5.7 microns in the infrared spectrum.

A coating of this polymer was melt applied on an acetone-degreased strip of bright aluminum at 300° C. Even at a coating thickness of only 0.1 mil, the coating gave excellent adhesion results in the Grid-Bend-Boil Test. Fibers were readily drawn from the melted polymer. At room temperature, these fibers were brittle.

The terpolymer prepared in this example dissolved in boiling dimethylformamide and in boiling dimethylacetamide. On cooling these boiling solutions the polymer separated. The polymer was only slightly soluble in boiling trichloroethylene or 1,1,1,3-tetrachloro-2,2,3,3-tetrafluoropropane.

When heated on a brass block the polymer softened at about 197° C. and had a "sticking temperature" of 216° C.

"Sticking temperature" is a softening temperature which is measured by a determination of the lowest temperature of a heated brass block at which a polymer in contact with the block leaves a molten trail when moved across the block.

When dibutyl maleate and 2-chloroethyl methacrylate are substituted for the t-butyl methacrylate in the procedure above, polymers, are obtained in good yield which combine the balance of properties necessary to form protective surface coatings with long-term outdoor adhesion durability.

Example 3

A 400 ml. pressure vessel was charged with 230 ml. of deoxygenated water, 3 g. (0.012 mole) of dineopentyl vinylphosphonate, 1.0 ml. of an aqueous solution of a surfactant comprising a salt of a mixture of mono- and bis-polyfluoroalkyl phosphates as described in U.S. Patent 3,083,224, 20 ml. of t-butanol, 3 g. of potassium peroxydisulfate, 0.6 g. of sodium metabisulfite, and 3 g. of sodium monohydrogen o-phosphate heptahydrate. The pressure vessel was closed, cooled in a carbon ice-acetone bath and evacuated. To the cold mixture was added 50 g. (0.50 mole) of tetrafluoroethylene and 20 g. (0.71 mole) of ethylene. The vessel and its contents were then heated to 62° C. at which temperature the autogenous pressure measured 1450 p.s.i. The pressure vessel was then shaken continuously over a period of 6 hours while the temperature was slowly increased to 100° C. At the end of the heating period, the pressure was 300 p.s.i. at 100° C. The vessel and its contents were then cooled to room temperature and the reaction mixture discharged. This reaction mixture was a dispersion which settled slightly on standing. The dispersion was made acid with hydrochloric acid in order to precipitate the polymer. The precipitated polymer was separated by filtration from the reaction mixture and washed thoroughly with 2 liters ethanol. After drying the polymer at 100° C. in a vacuum oven, a polymer product weighing 74 g. was obtained.

Elemental analysis of the polymer revealed that the polymer product contained 0.21% phosphorus, 52.8% fluorine, 41.7% carbon and 4.1% hydrogen. This composition analysis indicated an incorporation in the polymer of 1.7% by weight of groupings derived from dineopentyl vinylphosphonate, 69.5% by weight of groupings derived from tetrafluoroethylene and 28.8% by weight of groupings derived from ethylene. Thus, the analysis indicated that the mole ratios of the tetrafluoroethylene:ethylene: dineopentyl vinylphosphonate in the final terpolymer were 1.0:1.48:0.01.

A coating of the polymer was melt applied to an acetone-degreased bright aluminum strip at 275° C. An X-cut was made through the coating to the aluminum below and the coated aluminum strip boiled in water. The adhesion of the film was then tested with a pressure sensitive tape at the X-cut and found to be good with no failure. When subjected to the Grid-Bend-Boil Test, the coating showed slight failure at the bend. A coating of the polymer when melt applied in a similar manner on Alodine 1200 aluminum (aluminum surfaced with a conversion coating) gave good results when subjected to the Grid-Bend-Boil Test with no failure in adhesion or change in the appearance of the metal beneath the coating.

Bonderized steel panels, 4 x 6 inches, were also coated with the polymer by placing the panels on a hot plate at 650 to 700° F., adding the polymer to the surface of the panel, and then evenly spreading the molten polymer with a spatula. After quenching in water, the coating showed good adhesion and was quite hard as evidenced by its resistance to mar by the thumbnail.

When vinylphosphonic acid or disodium vinylphosphonate are substituted for the dineopentyl vinylphosphonate in the above procedure, polymers exhibiting similar properties are obtained.

Example 4

The procedure of Example 3 was repeated using 175 ml. of acetic acid, 100 ml. of 1,1,2-trichloro-1,2,2-trifluoroethane, 1.2 g. (0.01 mole) of dimethyl allylphosphonate, 0.5 g. of dilauroyl peroxide, 75 g. (0.75 mole) of tetrafluoroethylene and 18 g. (0.64 mole) of ethylene. The polymerization mixture was heated to 60° C. After shaking the mixture at 60 to 61° C. for 2 hours, an exothermic reaction occurred whereby the temperature increased to 138° C. The heating was stopped immediately and the reaction mixture cooled to room temperature. The polymer was isolated by diluting the reaction mixture with an equal volume of ethanol in order to precipitate the polymer. The polymer was then filtered from the reaction mixture and washed with 2 liters of ethanol. After drying at 100° C. in a vacuum oven the polymer product weighed 70 grams.

Elemental analysis showed that the polymer contained 0.7% phosphorus which indicated an incorporation of 3.5% by weight of dimethyl allylphosphonate-derived units in the polymer and 57.6% fluorine which indicated 76% of the polymer chain units were derived from tetrafluoroethylene.

The analytical data indicated that the monomers were present in the polymer in the ratio of 1.0 mole of tetrafluoroethylene/0.98 mole of ethylene/0.03 mole of dimethyl allylphosphonate.

A coating of this polymer was melt applied to bright aluminum at 340° C. to give a continuous, slightly milky film. The film exhibited good adhesion to the aluminum substrate.

The dimethyl allylphosphonate terpolymer prepared in this example was very resistant even to boiling solvents, being only slightly soluble in boiling dimethylformamide, dimethylacetamide, trichloroethylene and 1,1,1-tetrachloro-2,2,3,3-tetrafluoropropane.

The dimethyl allylphosphonate terpolymer softened over the range of 170 to 200° C. and had a sticking point of 263° C.

A similar terpolymer was prepared from 75 g. of tetrafluoroethylene, 21 g. of ethylene and 1.0 g. of bis(2-chloropropyl)allylphosphonate. A sandwich of this powdered terpolymer between sheets of clean, bright aluminum was then heated to 290° C. for 3 minutes. After cooling to room temperature the aluminum sheets were firmly bound together. In a similar experiment, two sections of Alodine aluminum sheeting were also bonded togther by the tetrafluoroethylene, ethylene, bis(2-chloropropyl) allylphosphonate terpolymer.

Example 5

A 400 ml. pressure vessel was flushed with nitrogen and charged with 175 ml. of acetic acid, 125 ml. of 1,1,2-trichloro-1,2,2-trifluoroethane, 1.2 g. (0.0053 mole) of bis (2-chloroethyl) vinylphosphonate and 0.4 g. of t-butyl perbenzoate. The vessel was closed, cooled in a carbon ice-cream acetone bath and evacuated. Seventy-five g. of tetrafluoroethylene, 11 g. (0.395 mole) of ethylene and 20 g. (0.365 mole) of isobutylene were then added under pressure, and the vessel and its contents were heated to 105° C. at which temperature the autogenous pressure was 2800 p.s.i. With continuous shaking, the temperature was slowly increased to 125° C. over a period of 12 hours. At the end of the heating period, the autogenous pressure had fallen to 1400 p.s.i. at 125° C. The reaction mixture was cooled to room temperature and discharged from the pressure vessel. After dilution with an equal volume of ethanol, the precipitated polymer was separated by filtration and washed thoroughly with 2 liters of ethanol. Twenty-seven g. of dried polymer were obtained.

Elemental analysis gave the following results:

Fluorine 45.8%—Indicated that 61% by weight of the polymer chain units were derived from tetrafluoroethylene.

Phosphorus 0.35%—indicated 2.5% by weight of the polymer chain units were derived from bis(2-chloroethyl) vinylphosphonate.

A coating of this tetrapolymer of tetrafluoroethylene, ethylene, isobutylene, and bis(2-chloroethyl) vinylphosphonate was melt applied to bright aluminum at about 275° C. This coating was clear and exhibited good adhession even after boiling in water for several hours.

Long fibers were drawn from the melt, and these fibers were cold drawable at room temperature.

The tetra-polymer was soluble in the following solvents at the solvent boiling point: trichloroethylene, dimethylformamide, dimethylacetamide and 1,1,1,3-tetrachloro-2,2,3,3,-tetrafluoropropane.

The sticking temperature of the tetra-polymer was 66° C.

When 1-hexene and methylenenorbornylene are substituted in the above procedure for isobutylene, polymers similar to the isobutylene tetra-polymer are obtained in good yields.

Example 6

Example 5 was repeated using 175 ml. of acetic acid, 125 ml. of 1,1,2-trichloro-1,2,2-trifluoroethane, 0.4 g. of a 75% solution of t-butyl peroxypivalate in mineral spirits, 75 g. (0.75 mole) of tetrafluoroethylene, 21 g. (0.75 mole) of ethylene, 1.2 g. (0.0047 mole) of bis (2-chloropropyl) allylphosphonate and 10 g. (0.086 mole) of chlorotrifluoroethylene. The polymerization mixture was heated to 40° C. with continuous shaking. An exothermic reaction was noted after one hour with the temperature rising to 54° C. during the next 25 minutes and to 90° C. by the end of an additional hour. After cooling the mixture to room temperature, the reaction product was discharged as a mush from which a solid polymer, in an amount of 86 g., was isolated.

Elemental analysis of the dried polymer gave the following results:

| | Percent |
|---|---|
| Chlorine | 4.0 |
| Fluorine | 50.0 |
| Phosphorus | 0.09 |

Melt flow rate (295° C.)=3.8 grams/10 minutes. (Found by using a 2160 g. weight and an orifice 0.0825 inch in diameter and 0.319 inch in length.)

These results indicated that 0.8% by weight of the interpolymer was composed of chain units derived from bis(2-chloropropyl) allylphosphonate, and 59.7% by weight of chain units derived from tetrafluoroethylene, and 12.5% by weight of chain units derived from chlorotrifluoroethylene. The calculated mole ratio of the monomers present in the polymer was 1.0 mole of tetrafluoroethylene/1.6 moles ethylene/0.18 mole of chlorotrifluoroethylene/0.005 mole bis(2-chloropropyl) allylphosphonate.

A coating of this tetra-polymer of tetrafluoroethylene/ethylene/chlorotrifluoroethylene/bis(2 - chloropropyl) allylphosphonate was applied from the melt to a strip of bright aluminum to give a slightly cloudy coating. This continuous coating exhibited good adhesion to the substrate even when subjected to boiling water.

The tetra-polymer was found to be very resistant to organic solvents being only slightly soluble in boiling trichloroethylene, dimethylacetamide, dimethylformamide and 1,1,1,3-tetrachloro-2,2,3,3-tetrafluoropropane.

The polymer softened at 232° C. when heated on a brass block. The sticking temperature of the polymer was 235° C.

When hexafluoropropylene and trifluoroethylene are substituted for the chlorotrifluoroethylene in the procedure described above, polymers with similar characteristics are obtained in good yields.

Example 7

Example 1 was repeated using 100 ml. of acetic acid, 150 ml. of 1,1,2 - trichloro-1,2,2-trifluoroethane, 18 g. (0.158 mole) of vinyl butyrate, 1.2 g. (0.0054 mole) of bis(2-chloroethyl) vinylphosphonate, 0.8 g. of dilauroyl peroxide, 75 g. (0.75 mole) of tetrafluoroethylene and 15 g. (0.54 mole) of ethylene.

The reaction mixture was heated to 60° C. with continuous shaking. After one hour at 60° C. the temperature was raised to 62° C. and then successively at 2-hour intervals raised to 65° C., 70° C., 75° C., 80° C., and 85° C. After cooling to room temperature the tetra-polymer of tetrafluoroethylene, ethylene, vinyl butyrate, and bis(2-chloroethyl) vinylphosphonate was isolated as in Example 1. The polymer was soluble in hot dimethylacetamide and a hard film having excellent clarity was cast from the dimethylacetamide solution at 150 C.

A coating of this tetra-polymer was melt applied at 250° C. to a strip of bright aluminum. This coating gives a good adhesion rating in the Grid-Bend-Boil Test. In contrast, an interpolymer of tetrafluoroethylene, ethylene and vinyl butyrate containing no bis(2-chloroethyl) vinylphosphonate and prepared by the above procedure gave a poor rating in the Grid-Bend-Boil Test with failure in adhesion at the bend.

When vinyl acetate or the vinyl ester

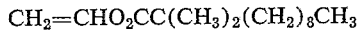

is substituted for the vinyl butyrate in the above procedure, polymers exhibiting similar properties to the tetra-polymer of this example are obtained in good yields.

Example 8

A 400 ml. silver-lined shaker tube was charged with 0.3 gram of benzoyl peroxide, 2 grams (0.028 mole) of acrylic acid and 100 ml. of distilled, deoxygenated water. The tube was cooled in a mixture of acetone and solid carbon dioxide, evacuated and charged with 60 grams (0.60 mole) of tetrafluoroethylene and 20 grams (0.72 mole) of ethylene. Water was injected into the shaker tube and the tube was heated with shaking such that at 80° C. the internal pressure was 2100 p.s.i. The tube was heated at 80° C. and 1900 to 2100 p.s.i. for 12 hours, being repressured by injection with water as necessary. Thereafter, the shaker tube was cooled and the volatile materials were allowed to evaporate. The hard, tough, white solid copolymer of tetrafluoroethylene, ethylene and acrylic acid that was formed in the polymerization was separated mechanically, shredded and dried in a vacuum oven at 60° C. The yield of polymer was 64 grams.

Elemental analysis showed that the copolymer contained 40.01% carbon, 3.75% hydrogen and 55.34% fluorine corresponding to 72.8 weight percent combined tetrafluoroethylene.

This analysis indicated that the polymer contained tetrafluoroethylene and acrylic acid at about the same ratio as the quantities of monomers charged to the shaker tube.

When itaconic or undecylenic acid is substituted for the acrylic acid in the above procedure, good yields of similar copolymers are obtained. Also, when derivatives of the ethylenically unsaturated polymerizable carboxylic acids such as itaconic anhydride or sodium acrylate are substituted for the acrylic acid above, good yields of copolymers with similar characteristics are obtained.

Example 9

The procedure of Example 1 was repeated using 75 g. (0.75 mole) of tetrafluoroethylene, 20 g. (0.72 mole) of ethylene, 25 g. (0.39 mole) of vinylidene fluoride, 2 g. (0.0089 mole) of bis(2-chloroethyl) vinylphosphonate, 0.5 ml. of a 75% solution of t-butyl peroxypivalate in mineral spirits, 100 ml. of glacial acetic acid and 100 ml. of 1,1,2-trichloro-1,2,2-trifluoroethane. The polymerization mixture was heated to 53° C. The autogenous pressure was 650 p.s.i. Thereafter, with continuous shaking the temperature was slowly increased to 80° C. over a period of 12 hours. At the end of this heating period the pressure was 290 p.s.i. at 80° C. After cooling to room temperature the product was isolated as in Example 1 to yield 106 g. of dry polymer.

A coating of the polymer of tetrafluoroethylene, ethylene, vinylidene fluoride and bis(2-chloroethyl) vinylphosphonate was melt applied to a strip of bright aluminum at 250° C.

The coating had a good rating in the Grid-Bend-Boil Test. A tough thread of the polymer was melt extruded at 250° C. A bonderized steel panel, 4 x 6 inches, was heated to 650 to 700° F. on a hot plate and a coating of the tetra-polymer was applied to the panel by using a spatula to spread the molten polymer into a uniform coating. The resulting clear, colorless coating had good adhesion and gave a hard coating resistant to marring by the thumbnail.

Example 10

Example 1 was repeated using 75 g. (0.75 mole) of tetrafluoroethylene, 20 g. (0.72 mole) of ethylene, 20 g. (0.112 mole) of vinyl 1,1,1,3,3,3 - hexafluoroisopropyl ether, 1.2 g. (0.0052 mole) of bis(2-chloroethyl) vinylphosphonate, 0.5 g. of dilauroyl peroxide, 200 ml. of acetic acid and 100 ml. of 1,1,2-trichloro-1,2,2-trifluoroethane The polymerization mixture was heated to 61° C. The autogenous pressure was 600 p.s.i. With continuous shaking the temperature was slowly increased to 80° C. over a period of 13 hours. At the end of this heating period, the pressure was 100 p.s.i. at 80° C. After cooling to room temperature, the mushy reaction product was isolated as in Example 1 to yield 97 g. of dry polymer.

A coating of the polymer was melt applied to bright aluminum at 230° C. to give a coating having excellent adhesion, stable to heat, light and water vapor at the interface. At 230° C., the polymer exhibited good melt flow properties. This tetra-polymer was somewhat brittle and failed at the bend in the Grid-Bend-Boil Test, although adhesion was still good over-all.

When methyl vinyl ether and hexyl vinyl ether are substituted for the vinyl 1,1,1,3,3,3-hexafluoroisopropyl ether in the above procedure, good yields of polymers exhibiting similar properties were obtained.

Example 11

A copolymer (Polymer I) of tetrafluoroethylene with ethylene was prepared according to the procedure of Example 1 using 60 g. of tetrafluoroethylene, 17 g. of ethylene, 0.4 ml. of a 75% solution of t-butyl peroxypivalate in mineral spirits as initiator and 300 ml. of 2,2,3,3-tetrafluoropropyl acetate as the reaction medium. The polymerization reaction was initiated at 50° C. The product, isolated as in Example 1, was a white solid which weighed 60 g. after drying. Analysis indicated 58.8% fluorine and a composition corresponding to 1.05 mole of ethylene for each mole of tetrafluoroethylene in the polymer.

A terpolymer (Polymer II) was prepared from 60 g. (0.60 mole) tetrafluoroethylene, 17 g. (0.61 mole) of ethylene and 2.4 g. (0.011 mole) of bis(2-chloroethyl) vinylphosphonate using 0.6 ml. of a 75% solution of t-butyl peroxypivalate in mineral spirits as initiator and 300 ml. of 2,2,3,3-tetrafluoropropyl acetate as the reaction medium. The reaction conditions were maintained as nearly identical as possible to those used in the preparation of Polymer I. The yield of dry Polymer II, a white solid, was 64 g. Analysis indicated 56.7% fluorine and 0.44% phosphorus which corresponded to 0.02 mole of bis(2-chloroethyl) vinylphosphonate and 1.05 mole of ethylene for each mole of tetrafluoroethylene in the polymer.

The adhesion, as measured by the Grid-Bend-Boil Test, of melt-applied coatings of each polymer was determined on panels of commercial bright aluminum sheeting as received (not cleaned) and on bright aluminum panels cleaned by methyl ethyl ketone. Coatings 1 to 2 mils thick were obtained by melting and spreading with a spatula 0.3 g. of the polymer on 2 x 3 inch aluminum panels on a hot plate at 300° C. The coating was held at the 300° C. temperature for one minute before quenching in tap water. Coatings 4 to 5 mils thick were also prepared from Polymers I and II in the same manner at 300° C. using 0.75 g. samples of the polymers. The adhesion results of the coatings are as follows:

| Polymer | 1-2 mil coating on Al | | 4-5 mil coating on Al | |
|---|---|---|---|---|
| | Cleaned | Not cleaned | Cleaned | Not cleaned |
| I | Poor [1] | Poor [1] | Poor [1] | Poor.[1] |
| II | Good | Good | Good | Good. |

[1] Slight adhesive failure at bend before boiling. Additional failure after one hour in boiling water. Adhesion is slightly better on clean aluminum.

Example 12

Polymer A, a copolymer of tetrafluoroethylene and ethylene, was prepared according to the procedure of Example 1 using 50 g. of tetrafluoroethylene and 15 g. of ethylene in a medium of 200 ml. of acetic acid and 100 ml. of 1,1,2-trifluoro-1,2,2-trichloroethane with 0.3 g. of dilauroyl peroxide as initiator at a temperature of 60 to 80° C. for 14 hours.

Polymer B was also a two-component copolymer of tetrafluoroethylene and ethylene. It was prepared by a continuous process where in tetrafluoroethylene at a rate of 100 g./hr., ethylene at 26 g./hr. and medium-initiator solution at 1000 ml./hr. were fed continuously into an agitated pressure vessel having its contents at a pressure of 700 to 800 p.s.i. and a temperature of 70 to 75° C.

Polymer C was prepared by following the procedure of Example 5 using 75 g. of tetrafluoroethylene, 15 g. of ethylene and 1.2 g. of bis(2-chloroethyl) vinylphosphonate.

A coating of each polymer was melt applied to a degreased, clean, bright aluminum panel heated to 300° C. on a hot plate. The molten polymer was spread uniformly over the aluminum panel with a spatula to give a 1 to 2 mil coating. The polymer coating was held at 300° C. for one minute before quenching in tap water. One sample of each polymer coatings A, B and C, on bright aluminum was subjected to the Grid-Bend-Boil Test (boiling water for one hour) and a second sample of each, together with similar samples prepared from polymers prepared in Examples 1, 3, 5, 9 and 10, were cut in a grid or cross-hatched pattern and exposed in an accelerated weathering machine for 46 hours. The weathering machine used was an "Atlas Weather-Ometer" (Atlas Electric Devices Co., Chicago, Illinois) from which the glass filters had been removed. The melt-coated panels were continuously subjected to the unfiltered light of the carbon arc and for 18 minutes out of every two hours were also subjected to a spray of distilled water. The air temperature in the machine was 140° F. and the surface temperature of a black panel set in exposure position reached a high of 165 to 170° F. each time before being cooled by the water spray.

The samples, after exposure in the weathering machine, were bent (folded) through the grid section with the coating on the outside of a 90-degree bend. If no failure in coating adhesion occurred as a result of the bending, a piece of pressure-sensitive tape was applied to the cross-hatched area so that the tape was stuck to both sides of the bent strip and across the bend. Good adhesion was indicated when none of the coating was removed on removal of the tape, fair adhesion when the coating failed only at the bend and poor adhesion when the coating failed over most of the cross-hatched area or when failure occurred during the bending prior to application of the pressure-sensitive tape.

The initial adhesion of each of the melt-applied polymer coatings A and B was good; however, the weathering machine results showed that the durability of adhesion to weathering conditions was good only for those polymers containing acid monomers or derivatives thereof.

The superior durable adhesion of coatings of the invention interpolymers to exposure to a combination of light, moisture and temperature variation is shown by the data summarized below.

TABLE.—ADHESION AFTER EXPOSURE IN WEATHERING MACHINE

| Polymer | Adhesion to aluminum | |
|---|---|---|
| | Initial | After 46 hrs. in Weather-Ometer |
| A | Good | Poor. |
| B | do | Do. |
| C | do | Good. |
| Example 1 | do | Do. |
| Example 3 | do | Do. |
| Example 5 | do | Do. |
| Example 9 | do | Do. |
| Example 10 | do | Do. |

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof it is to be understood that this invention is not limited to the specific embodiments thereof except as defined in the appended claims.

The embodiment of the invention in which an exclusive property or privilege is claimed are defined as follows:

1. A solid linear addition-type copolymer comprising in copolymerized form (1) tetrafluoroethylene; (2) from about 0.75 to about 1.75 moles of ethylene per mole of tetrafluoroethylene; and (3) from 0.001 to 0.1 mole per mole of tetrafluoroethylene of at least one polymerizable olefinic acid having an acidity constant of from 1.0 to 5.5, the lower alkyl esters, the salts, and the anhydrides of such acids.

2. A solid linear addition-type copolymer comprising in copolymerized form (1) tetrafluoroethylene; (2) from about 0.75 to about 1.75 moles of ethylene per mole of tetrafluoroethylene; and (3) from 0.001 to 0.1 mole per mole of tetrafluoroethylene of a polymerizable acid compound having an acidity constant of from 1.0 to 5.5 which is selected from the group consisting of
   (A) the ethylenically unsaturated mono- and dicarboxylic acids having from three to eleven carbon atoms,
   (B) the lower alkyl mono- and diesters, the salts, and the anhydrides of such carboxylic acids,
   (C) the ethylenically unsaturated phosphonic acids having up to eighteen carbon atoms, and
   (D) the lower alkyl mono- and diesters, the salts, and the anhydrides of such phosphonic acids.

3. A solid linear addition-type copolymer of claim 1 wherein the ethylenically unsaturated polymerizable acid compound is present in an amount of from 0.01 to 0.05 mole per mole of tetrafluoroethylene.

4. A solid linear addition type copolymer comprising in copolymerized form (1) tetrafluoroethylene; (2) from about 0.75 to about 1.75 moles of ethylene per mole of tetrafluoroethylene; (3) from 0.001 to 0.1 mole per mole of tetrafluoroethylene of at least one polymerizable olefinic acid having an acidity constant of from 1.0 to 5.5, the lower alkyl esters, the salts, and the anhydrides of such acids; and (4) from about 0.05 to about 0.50 mole per mole of tetrafluoroethylene of a polymerizable compound chosen from the group consisting of aliphatic hydrocarbons of from 3 to 8 carbon atoms having only one terminal ethylenically unsaturated polymerizable group, chloroolefins of 2 to 3 carbon atoms, fluoroolefins of 2 to 3 carbon atoms, chlorofluoroolefins of 2 to 3 carbon atoms, vinyl alkyl ethers, wherein the alkyl group contains from one to six carbon atoms, and vinyl esters of a $C_2$ to $C_{18}$ alkane carbovylic acid.

5. A solid linear addition-type copolymer of claim 4 wherein an additional compound is present in an amount of from about 0.05 to about 0.50 mole per mole of tetrafluoroethylene and said additional compound is a chlorofluoroolefin of 2 to 3 carbon atoms.

6. A solid linear addition-type copolymer of claim 4 wherein an additional compound is present in an amount of from about 0.05 to about 0.50 mole per mole of tetrafluoroethylene and said additional compound is an aliphatic hydrocarbon of from 3 to 8 carbon atoms having only one terminal ethylenically unsaturated polymerizable group.

7. A solid linear addition-type copolymer of claim 4 wherein an additional compound is present in an amount of from about 0.05 to about 0.50 mole per mole of tetrafluoroethylene and said additional compound is a vinyl alkyl ether wherein the alkyl group contains from one to six carbon atoms.

8. A solid linear addition-type copolymer of claim 4 wherein an additional compound is present in an amount of from 0.05 to about 0.50 mole per mole of tetrafluoroethylene and said additional compound is a vinyl ester of a $C_2$ to $C_{18}$ alkane carboxylic acid.

9. A solid linear addition-type copolymer comprising in copolymerized form (1) tetrafluoroethylene; (2) from about 0.75 to about 1.75 moles of ethylene per mole of tetrafluoroethylene; and (3) from about 0.001 to about 0.1 mole per mole of tetrafluoroethylene of a lower alkyl ester of an ethylenically unsaturated phosphonic acid having up to eighteen carbon atoms.

10. A solid linear addition-type copolymer comprising in copolymerized form (1) tetrafluoroethylene; (2) from about 0.75 to about 1.75 moles of ethylene per mole of tetrafluoroethylene; (3) from 0.001 to 0.1 mole of bis(2-chloropropyl) allylphosphonate per mole of tetrafluoroethylene; and (4) from about 0.05 to 0.50 mole of chlorotrifluoroethylene per mole of tetrafluoroethylene.

11. A solid linear addition-type copolymer comprising in copolymerized form (1) tetrafluoroethylene; (2) from about 0.75 to about 1.75 moles of ethylene per mole of tetrafluoroethylene; and (3) from about 0.001 to 0.1 mole of bis(2-chloroethyl) vinylphosphonate per mole of tetrafluoroethylene.

12. A solid linear addition-type copolymer comprising in copolymerized form (1) tetrafluoroethylene; (2) from about 0.75 to about 1.75 moles of ethylene per mole of tetrafluoroethylene; and (3) from about 0.001 to 0.1 mole of dineopentyl vinylphosphonate per mole of tetrafluoroethylene.

13. A solid linear addition-type copolymer comprising in copolymerized form (1) tetrafluoroethylene; (2) from about 0.75 to aobut 1.75 moles of ethylene per mole of tetrafluoroethylene; and (3) from about 0.001 to 0.1 mole of acrylic acid per mole of tetrafluoroethylene.

14. A solid linear addition-type copolymer comprising in copolymerized form (1) tetrafluoroethylene; (2) from about 0.75 to about 1.75 moles of ethylene per mole of tetrafluoroethylene; and (3) from about 0.001 to 0.1 mole of dimethyl allylphosphonate per mole of tetrafluoroethylene.

15. An article of manufacture comprising a solid metal structural surface having thereon an adherent flexible film prepared from a copolymer of claim 1.

16. An article of manufacture compirsing a solid aluminum structural surface having thereon an adherent flexible film prepared from a copolymer of claim 1.

References Cited

UNITED STATES PATENTS

| | | | |
|---|---|---|---|
| 3,380,971 | 4/1968 | Chalmers et al. | 260—78.5 |
| 3,380,974 | 4/1968 | Stilmar | 260—80.8 |
| 3,318,850 | 5/1967 | Stilmar | 260—78.5 |
| 3,080,347 | 5/1963 | Sandberg | 260—80.6 |

JOSEPH L. SCHOFER, *Primary Examiner.*

R. S. BENJAMIN, *Assistant Examiner.*

U.S. Cl. X.R.

260—80.76, 80.77, 80.78, 80.8, 80.81